United States Patent Office 3,479,334
Patented Nov. 18, 1969

3,479,334
PROCESS FOR SELECTIVELY PREPARING LINCOMYCIN 7 - ACYLATES AND 7-CARBONATES
Ronald L. Houtman, Parchment, and Walter Morozowich and Anthony A. Sinkula, Kalamazoo, Mich., assignors to The Upjohn Company, Kalamazoo, Mich., a corporation of Delaware
No Drawing. Filed Sept. 29, 1967, Ser. No. 671,591
Int. Cl. C07g 3/00
U.S. Cl. 260—210
8 Claims

ABSTRACT OF THE DISCLOSURE

Process for producing lincomycin 7-acylates which comprises:
(1) silylating lincomycin to produce 2,3,4,7-tetrakis-O-(trimethylsilyl)lincomycin;
(2) hydrolyzing 2,3,4,7 - tetrakis-O-(trimethylsilyl)lincomycin to 2,3,4-tris-O-(trimethylsilyl)lincomycin;
(3) acylating 2,3,4-tris-O-(trimethylsilyl)lincomycin to produce 2,3,4-tris - O - (trimethylsilyl)lincomycin 7-acylate; and
(4) hydrolyzing 2,3,4-tris-O-(trimethylsilyl)lincomycin 7-acylate to produce lincomycin 7-acylate.

Lincomycin 7-carbonates can be made by the same process except for the substitution of a carbonation step for the acylation step. Lincomycin 7-acylates and lincomycin 7-carbonates are antibacterial agents.

BRIEF SUMMARY OF THE INVENTION

This invention relates to a novel process for making lincomycin 7-acylates wherein the acyl group is a hydrocarbon carboxylic acid acyl of from 2 to 18 carbon atoms, inclusive, and lincomycin 7-carbonate esters wherein the carbonate group is derived from an alkyl haloformate wherein the alkyl is from 1 to 18 carbon atoms, inclusive. More particularly, this invention is directed to a process for making lincomycin 7-acylates and lincomycin 7-carbonate esters by first converting lincomycin to 2,3,4,7-tetrakis-O-(trimethylsilyl)lincomycin, hydrolyzing this compound to 2,3,4-tris-O-(trimethylsilyl)lincomycin, acylating or carbonating this compound, then removing the silyl groups to yield lincomycin 7-acylates or lincomycin 7-carbonate esters.

Lincomycin 7-acylates have been produced in the prior art by several methods. One method involves the acylation of lincomycin with a minimum amount of acylating agent. The product of this reaction generally results in a mixture of lincomycin 2- and 7-acylates as well as the presence of other lincomycin acylates, for example, lincomycin di-, tri-, and tetraacylates. In such a procedure, it is necessary to conduct a separation of the various acylates in order to isolate and purify the desired lincomycin 7-acylates. Such a process is both time-consuming and expensive. In other prior art process for making lincomycin 7-acylate, lincomycin 2,7-diacylate is subjected to acid hydrolysis. Such a process is very difficult to control and it is somewhat destructive. Also, the acid hydrolysis process does not produce lincomycin 7-acylate only. Generally, upon the acid hydrolysis of lincomycin 2,7-diacylate, there is produced a mixture of lincomycin 2-acylate and lincomycin 7-acylate which then must be resolved by countercurrent distribution in order to obtain pure lincomycin 7-acylate. As is readily apparent, such a process is also time-consuming and expensive. Another method for making lincomycin 7-acylate, which is an improvement over the above-mentioned processes, concerns the alcoholysis of lincomycin 2,3,4,7-tetraacylates or lincomycin 2,7-diacylates. In this process, the acyl group on the 7-position of the lincomycin molecule unexpectedly remains on the molecule while the other acylates are separated therefrom.

The process of the subject invention is an improvement over the above-mentioned processes for making lincomycin 7-acylates. The improvement in the subject process is in the increased yield of lincomycin 7-acylate. Yields of 87% are obtained in the invention process. This yield of lincomycin 7-acylate is a dramatic improvement over the above-described alcoholysis process, which is the best prior art process for making lincomycin 7-acylates, wherein the yields are in the order of about 50% of theoretical. Thus, the subject process yields about 37% more lincomycin 7-acylate than the best prior art process.

As in the best prior art process, i.e., the alcoholysis process, the process of the subject invention is specific for the making of lincomycin 7-acylates. This specificity of product is important in obtaining the high over-all yield of the process for making lincomycin 7-acylates. Because of this specificity, the product obtained after removal of the silyl groups is already high quality crystalline material of lincomycin 7-acylate.

The invention process also gives higher yields of lincomycin 7-carbonate esters as compared to prior art processes. The best known prior art method for synthesizing lincomycin-7-carbonate is that which utilizes 3,4-O-arylidene lincomycin as an intermediate. In that process, lincomycin is first converted to 3,4-O-arylidene lincomycin by condensing lincomycin, advantageously as the hydrochloride, with an aromatic aldehyde. Acid catalysis of the reaction is unnecessary since the hydrochloride salt of lincomycin provides sufficient catalysis of the reaction. The reaction is forced to completion through azeotropic removal of water by an organic solvent, for example, benzene, toluene, chloroform, ethylene chloride, and the like. The azeotrope-forming solvent is used in admixture with a highly polar solvent, such as N,N-dimethylformamide, N,N-dimethylacetamide, dimethylsulfoxide, N-methyl pyrrolidone, and the like, in order to solubilize lincomycin hydrochloride, and thus produce a homogeneous solution. The condensation reaction can be conducted between temperatures of about 70° to 180° C., the preferred temperature being about 90° to 110° C. The reaction is usually complete in from 1 to 10 hours.

3,4-O-arylidene lincomycin, dissolved in acetone, is then reacted with a carbonation agent, for example, methyl chloroformate. The pH of the reaction is maintained between 5 and 7 with an alkali, for example, sodium hydroxide, and the reaction is generally complete in about 1 to 2 hours. The desired product is recovered by first removing the acetone under vacuum at room temperature, then extracting the remaining aqueous with ether. The ether extracts, which contain the desired product, are combined, dried over anhydrous magnesium sulfate, and the ether removed under reduced pressure to yield lincomycin-7-methyl carbonate.

The applicants' subject process for preparing lincomycin-7-carbonates results in higher process yields than the above-described best known prior art process for preparing lincomycin-7-carbonates.

The applicants' invention also concerns the novel intermediates 2,3,4-tris - O - (trimethylsilyl)lincomycin 7-acylates, and 2,3,4-tris - O - (trimethylsilyl)lincomycin 7-carbonates. These intermediates are useful to make lincomycin is first converted to 3,4-O-arylidene lincomycin novel procedures disclosed herein.

Lincomycin 7-acylates and lincomycin 7-carbonates have essentially the same antibacterial spectrum as the antibiotic lincomycin. Thus, these compounds can be used as antibacterial agents. For example, lincomycin 7-acetate inhibits the growth of *Staphylococcus aureus*, and, therefore, is useful as a disinfectant on washed and stacked food utensils contaminated with this organism. Lincomycin 7-acylates and lincomycin 7-carbonates also can be used to inhibit Gram-positive sporeformer spreaders on agar plates when isolating molds, yeasts, Streptomycetes, and Gram-negative organisms. They can be used, for example, in the isolation of micro-organisms from soil samples, as well as in the isolation of Gram-negative organisms, for example, Pseudomonas, Proteus, and *Escherichia coli*, from mixed infections in the presence of Staphylococci and/or Streptococci.

DETAILED DESCRIPTION

In carrying out the process of the invention, lincomycin, either as the free base or as an acid-addition salt, is reacted with a silylating agent in a solvent for the reactants. An especially suitable silylating agent is hexamethyldisilazane with trimethylchlorosilane as catalyst. Anhydrous pyridine is a useful solvent. Excess hexamethyldisilazane, i.e., above the stoichiometric amount, is preferably used to obviate adverse effects of any traces of moisture in the reaction medium. Silylation at the 2, 3,4,7-hydroxyl groups occurs readily at from about 10° C. to about 60° C., resulting in the formation of the tetra-substituted trimethylsilyl ether compound. This compound can be converted to 2,3,4-tris-O-(trimethylsilyl)lincomycin by acidic hydrolysis. For example, on subjecting 2,3,4,7-tetrakis-O-(trimethylsilyl)lincomycin to acid hydrolysis using 6 N acetic acid for about 48 hours, there is produced 2,3,4-tris-O-(trimethylsilyl)lincomycin. Other acids which can be used in the hydrolysis reaction are hydrochloric, and sulfuric, either in aqueous solution or organic-aqueous mixtures, for example, methanolic and ethanolic hydrochloric acid.

For purification of the etherified compounds, the reaction mixture is concentrated to dryness and taken up in chloroform. The chloroform solution is washed with water and filtered through silica gel which retains impurities. The filtered chloroform solution is evaporated to dryness to yield the purified silyl ether.

Acylation of 2,3,4-tris-O-(trimethylsilyl)lincomycin is accomplished by reacting this compound with an acid halide or anhydride of a selected hydrocarbon carboxylic acid in the presence of an acid-binding agent, for example, a tertiary amine, to produce 2,3,4-tris-O-(trimethylsilyl) lincomycin 7-acylates. Suitable tertiary amines include heterocyclic amines, such as pyridine, quinoline, and isoquinoline; trialkylamines such as trimethylamine, triethylamine, triisopropylamine, and the like; N,N-dialkylanilines such as dimethylaniline, diethylaniline, and the like; and N-alkylpiperidines such as N-ethylpiperidine, N-methylpiperidine, and the like. The preferred base is pyridine.

Carboxylic acids suitable for esterification include (a) saturated or unsaturated, straight or branched chain aliphatic carboxylic acids, for example, acetic, propionic, butyric, isobutyric, tert-butylacetic, valeric, isovaleric, caproic, caprylic, decanoic, dodecanoic, lauric, tridecoic, myristic, pentadecanoic, palmitic, margaric, steric, acrylic, crotonic, undecylenic, oleic, hexynoic, heptynoic, octynoic acids, and the like; (b) saturated or unsaturated, alicyclic carboxylic acids, for example, cyclobutanecarboxylic acid, cyclopentanecarboxylic acid, cyclopentenecarboxylic acid, methylcyclopentenecarboxylic acid, cyclohexanecarboxylic acid, dimethylcyclohexenecarboxylic acid, dipropylcyclohexanecarboxylic acid, and the like; (c) saturated or unsaturated, alicyclic aliphatic carboxylic acids, for example, cyclopentaneacetic acid, cyclopentanepropionic acid, cyclopenteneacetic acid, cyclohexanebutyric acid, methylcyclohexaneacetic acid, and the like; (d) aromatic carboxylic acids, for example, benzoic acid, toluic acid, naphthoic acid, ethylbenzoic acid, isobutylbenzoic acid, methylbutylbenzoic acid, and the like; and (e) aromatic-aliphatic carboxylic acids, for example, phenylacetic acid, phenylpropionic acid, phenylvaleric acid, cinnamic acid, phenylpropiolic acid and naphthylacetic acid, and the like. Suitable halo-, nitro-, hydroxy-, amino-, cyano-, thiocyano-, and lower alkoxyhydrocarbon carboxylic acids include hydrocarbon carboxylic acids as given above which are substituted by one or more of halogen, nitro, hydroxy, amino, cyano, or thiocyano, or loweralkoxy, for example, methoxy, ethoxy, propoxy, butoxy, amyloxy, hexyloxy, and isomeric forms thereof. Examples of such substituted hydrocarbon carboxylic acids are mono-, di-, and trichloracetic acid; $\alpha$- and $\beta$-chloropropionic acid; $\alpha$- and $\gamma$-bromobutyric acid; $\alpha$- and $\delta$-iodovaleric acid; mevalnoic acid; 2- and 4-chlorocyclohexanecarboxylic acid; shikimic acid; 2-nitro-1-methyl-cyclobutanecarboxylic acid; 1,2,3,4,5,6-hexachlorocyclohexanecarboxylic acid; 3-bromo-2-methylcyclohexanecarboxylic acid; 4- and 5-bromo-2-methylcyclohexanecarboxylic acid; 5- and 6-bromo-2-methylcyclohexanecarboxylic acid; 2,3-dibromo-2-methylcyclohexanecarboxylic acid; 2,5-dibromo-2-methylcyclohexanecarboxylic acid; 4,5-dibromo-2-methylcyclohexanecarboxylic acid; 5,6-dibromo-2-methylcyclohexanecarboxylic acid; 3-bromo-3-methylcyclohexanecarboxylic acid; 6-bromo-3-methylcyclohexanecarboxylic acid; 1,6-dibromo-3-methylcyclohexanecarboxylic acid; 2-bromo-4-methylcyclohexanecarboxylic acid; 1,2-dibromo-4-methylcyclohexanecarboxylic acid; 3-bromo-2,2,3-trimethylcyclopentanecarboxylic acid; 1-bromo-3,5-dimethylcyclohexanecarboxylic acid; homogentisic acid, a-, m-, and p-chlorobenzoic acid; anisic acid; salicylic acid; p-hydroxybenzoic acid; $\beta$-resorcylic acid; gallic acid; veratric acid; trimethoxybenzoic acid; trimethoxycinnamic acid; 4,4'-dichlorobenzilic acid; o-, m-, and p-nitrobenzoic acid; cyanoacetic acid; 3,4- and 3,5-dinitrobenzoic acid; 2,4,6, trinitrobenzoic acid; thiocyanoacetic acid; cyanopropionic acid; lactic acid; ethoxyformic acid (ethyl hydrogen carbonate); methoxyformic acid; propoxyformic acid; butoxyformic acid; pentyloxyformic acid; hexyloxyformic acid; heptyloxyformic acid; octyloxyformic acid; nonyloxyformic acid; decyloxyformic acid; dodecyloxyformic acid; tetradecyloxyformic acid; hexadecyloxyformic acid; octadecyloxyformic acid; and the like.

The acylation is advantageously conducted by treating a solution of 2,3,4-tris-O-(trimethylsilyl)lincomycin in a tertiary amine with an acid halide or anhydride and heating the resulting mixture, if necessary, for a short period at about 100° C. to complete the reaction. Water is added to the reaction mixture to hydrolyze the acylating agent and the intermediate product is isolated by conventional procedures. Thus, upon reacting 2,3,4-tris-O-(trimethylsilyl)lincomycin in the presence of a tertiary amine with at least one mole of acylating agent, there is obtained 2,3,4-tris-O-(trimethylsilyl)lincomycin 7-acylate.

Lincomycin 7-acylates can be prepared from 2,3,4-tris-O-(trimethylsilyl)lincomycin 7-acylates by the selective removal of the silyl groups. The removal of these protective groups can be accomplished by mild acid hydrolysis. For example, the silyl groups can be removed with 80% acetic acid at room temperature over a period of 2 hours. Other dilute acids can be used, for example, hydrochloric, and sulfuric, either in aqueous solution or organic-aqueous mixtures, for example, methanolic and ethanolic hydrochloric acid. The resulting lincomycin 7-acylate is isolated as the hydrochloride salt when hydrochloric acid is used. This then can be recrystallized from a solvent, for example, methanol.

In the preparation of lincomycin 7-carbonates, lincomycin is first converted to 2,3,4,7-tetrakis-O-(trimethylsilyl)lincomycin, which is then hydrolyzed, as disclosed above, to a lincomycin 2,3,4-tris-O-(trimethylsilyl)ether. This latter compound is then reacted with a linear carbonate halide of from 1 to 18 carbon atoms, for example, methyl chloroformate, ethyl chloroformate, propyl chloroformate, butyl chloroformate, pentyl chloroformate, hexyl chloroformate, heptyl bromoformate, octyl chloroformate, nonyl chloroformate, decyl bromoformate, undecyl chloroformate, dodecyl chloroformate, tridecyl chloroformate, tetradecyl chloroformate, pentadecyl chloroformate, hexadecyl chloroformate, heptadecyl chloroformate, and octadecyl chloroformate to produce the corresponding 2,3,4-tris-O-(trimethylsilyl)-lincomycin 7-alkyl carbonate. For example, upon reacting 2,3,4-tris-O-(trimethylsilyl)lincomycin with n-hexyl chloroformate in the presence of an acid-binding agent, there is produced 2,3,4-tris-O-(trimethylsilyl)lincomycin 7-(hexyl) carbonate). The acid-binding agent can be the same as disclosed above in the acylation step of the invention process. Pyridine is preferred.

The carbonation reaction is advantageously conducted by treating a solution of 2,3,4-tris-O-(trimethylsilyl)lincomycin in a tertiary amine with an alkyl haloformate at room temperature or lower. For example, the reaction can be carried out at a temperature in the range of −35° C. to 0° C.

Upon reacting 2,3,4-tris-O-(trimethylsilyl)lincomycin 7-(hexyl carbonate) with a dilute acid there is obtained lincomycin 7-(hexyl carbonate). This selective removal of the silyl groups is accomplished under the same process conditions and with the same acids as disclosed above when the silyl groups were removed from the acylated silyl ether of lincomycin. For example, by the use of 80% acetic acid at room temperature over a period of 2 hours. the silyl groups are removed from 2,3,4-tris-O-(trimethylsilyl)lincomycin 7-(hexyl carbonate) to yield lincomycin 7-(hexyl carbonate).

The sequence of the above reactions can be shown as follows:

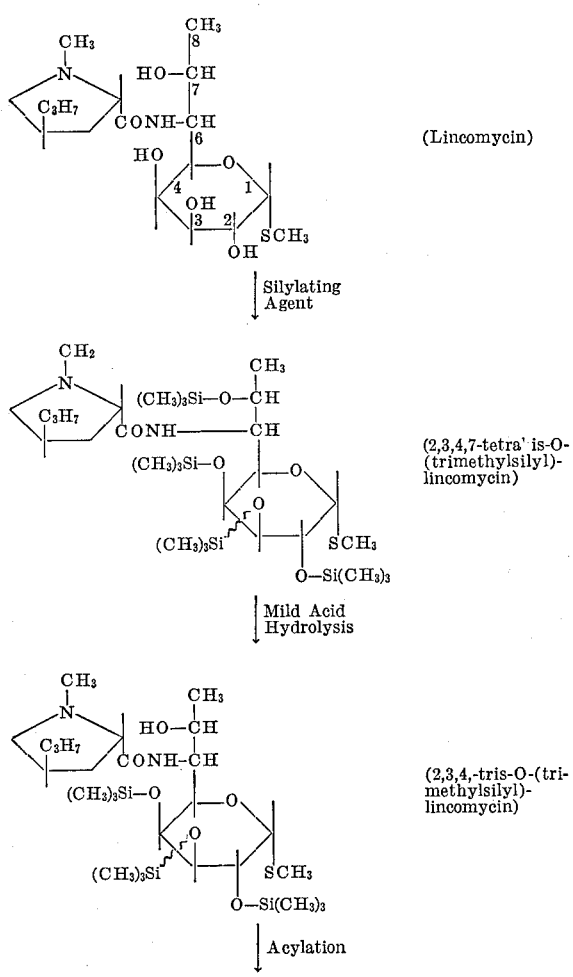

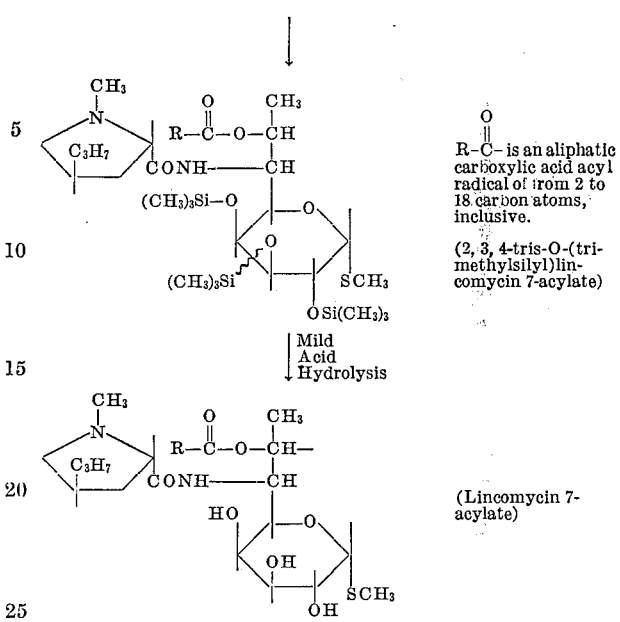

The following examples are illustrative of the process and products of the present invention, but are not to be construed as limiting.

EXAMPLE 1.—LINCOMYCIN 7-ACYLATE

Part A.—2,3,4,7-tetrakis-O-(trimethylsilyl)lincomycin

Ten gms. of lincomycin hydrochloride is dissolved in 100 ml. of dry pyridine and 15 ml. of hexamethyldisilazane and 2 ml. of trimethylchlorosilane is added. The reaction mixture is stirred vigorously for about 2 hours. Two hundred ml. of chloroform is dissolved in the mixture and pyridine is removed by washing with water. Recovery of the tetra(trimethylsilyl) compound is obtained by evaporation of the chloroform solution to dryness. The dry residue is dissolved in methanol-chloroform (1:40) and chromatographed over silica gel to yield an eluate from which crystalline 2,3,4,7-tetrakis-O-(trimethylsilyl)lincomycin is obtained upon evaporation to dryness.

Analysis.—Calc'd for $C_{30}H_{66}O_6N_2SSi_4$: C, 51.82; H, 9.57; N, 4.03; S, 4.61; m. wt. 695.15. Found: C, 51.65; H, 9.58; N, 4.03; S, 4.72; eq. wt. 700. $[\alpha]_D+111°$ (c., 1, chloroform).

Part B.—2,3,4-tris-O-(trimethylsilyl)lincomycin

Five gms. of 2,3,4,7-tetrakis-O-(trimethylsilyl)lincomycin (see Part A) is dissolved in 100 ml. of methanol. Five ml. of 6 N acetic acid is added and hydrolysis is followed by gas chromatography. After 48 hours the reaction is essentially complete. The trimethylsilyl compound is isolated and purified by evaporation of the methanol and acetic acid, redissolving the material in chloroform and washing with water. Thereafter the chloroform solution is filtered through silica gel to yield a filtrate which upon evaporation provides dry crystalline 2,3,4-tris-O-(trimethylsilyl)lincomycin.

Analysis.—Calc'd for $C_{27}H_{58}O_6N_2SSi_3$: C, 52.05; H, 9.38; N, 4.50; S, 5.15; m. wt. 622.99. Found: C, 52.34; H, 9.22; N, 4.32; S, 5.26; eq. wt. 626. $[\alpha]_D$ (CHCl$_3$) +121°.

Part C.—Lincomycin 7-acetate hydrochloride

A solution of 1.71 g. (3 moles) of 2,3,4-tris-O-(trimethylsilyl)lincomycin in 5 ml. dry pyridine was treated with 2 ml. of acetic anhydride and the solution was allowed to stand at room temperature for 16 hrs. The solution was concentrated to a viscous liquid under vacuum and the residue was dissolved in 8 ml. of glacial acetic acid. The solution was diluted with 2 ml. water and allowed to stand at room temperature for 2½ hrs. The solution was concentrated to a viscous liquid under vacuum and the residue was dissolved in 25 ml. of water. The aqueous solution was made alkaline with 25 ml. 8% sodium carbonate and extracted with four 25-ml. portions of chloroform. The chloroform extracts were combined and concentrated to a viscous liquid and the residue was dissolved in ether. The ether solution was treated with hydrogen chloride gas to precipitate lincomycin 7-acetate·HCl. This compound was isolated by filtration and dried under high vacuum to yield 1.27 g. (87% yield) white crystalline lincomycin 7-acetate·HCl. Recrystallization was achieved by solution of the compound in 6 ml. hot isopropyl alcohol followed by dilution with 100 ml. acetone. After storing the solution in the refrigerator for about 24 hrs., crystals of lincomycin 7-acetate·HCl were isolated by filtration and dried under vacuum, yield: 1.09 g. (91% recovery).

Analysis.—Calc'd for $C_{20}H_{37}N_2O_7SCl$: C, 49.52; H, 7.69; N, 5.77; S, 6.61; Cl, 7.31. Found: C, 49.29; H, 7.88; N, 5.50; S, 6.60; Cl, 7.51, $H_2O$, 3.74. (Corrections made for $H_2O$.)

The intermediate 2,3,4-tris-O-(trimethylsilyl)lincomycin 7-acetate can be isolated in the following manner. After esterification of 2,3,4-tris-O-(trimethylsilyl)lincomycin, excess acylating agent is decomposed by addition of methanol. The reaction mixture is evaporated to dryness under vacuum and the residue is dissolved in chloroform. The chloroform solution is washed with water and then the organic layer is dried. Evaporation of the chloroform layer provides 2,3,4-tris-O-(trimethylsilyl)lincomycin 7-acetate.

Acid-addition salts of the above intermediate can be prepared by treating an ethereal solution of 2,3,4-tris-O-(trimethylsilyl)lincomycin 7-acetate with, for example, gaseous HCl. Precipitation of the hydrochloride salt should occur, if not, the ethereal solution is evaporated to provide the hydrochloride salt.

In the same manner, as disclosed above, the intermediate compounds 2,3,4-tris-O-(trimethylsilyl)lincomycin 7-carbonates, as prepared in examples following, can be isolated from reaction mixtures and salts made. Also, other 2,3,4-tris-O-(trimethylsilyl)lincomycin 7-acylates can be isolated from reaction mixtures in the same manner and salts made.

EXAMPLE 2

By substituting the acetic anhydride in Example 1, Part C, by propionyl chloride, isobutyryl chloride, isovaleryl chloride, neopentylacetyl chloride, heptanoyl chloride, phenylacetyl chloride, toluoyl chloride, cyclopentanepropionyl chloride, 1-cyclopentene-1-propionyl chloride, cyclohexaneacetyl chloride, acrylyl chloride, crotonyl chloride, 2-hexynoyl chloride, 2-octynoyl chloride, choroacetyl bromide, p-chlorobenzoyl chloride, anisoyl chloride, salicyloyl bromide, p-nitrobenzoyl chloride, and cyanoacetyl chloride, there are obtained lincomycin 7-propionate, -isobutyrate, -isovalerate, -neopentylacetate, -heptanoate, -phenylacetate, -toluate, -cyclopentanepropionate, -1-cyclopentene-1-propionate, -cyclohexaneacetate, -acrylate, -crotonate, -2-hexynoate, -2-octynoate, -chloroacetate, -p-chlorobenzoate, -anisate, -salicylate, -p-nitrobenzoate, and -cyanoacetate, respectively.

EXAMPLE 3

By substituting the acetic anhydride in Example 1, Part C, by myristyl chloride, there is obtained lincomycin 7-myristate·HCl.

EXAMPLE 4

By substituting the acetic anhydride in Example 1, Part C, by butyryl chloride, there is obtained lincomycin 7-butyrate·HCl.

Analysis.—Calc'd for $C_{22}H_{41}N_2O_7SCl$: C, 51.50; H, 8.05; N, 5.46; S, 6.25. Found: C, 51.61; H, 8.10; N, 5.65; S, 6.26; $H_2O$, 5.99 (corrected for $H_2O$); molecular weight: 513.09.

EXAMPLE 5

By substituting the acetic anhydride in Example 1, Part C, by valeryl chloride, there is obtained lincomycin 7-valerate·HCl.

Analysis.—Calc'd for $C_{23}N_{43}N_2O_7SCl$: C, 52.41; H, 8.22; N, 5.31; S, 6.08; Cl, 6.73. Found: C, 52.60; H, 8.14; N, 5.62; S, 6.14; Cl, 6.87; $H_2O$, 5.59 (corrected for $H_2O$); molecular weight: 527.13.

EXAMPLE 6

By substituting the acetic anhydride in Example 1, Part C, by hexanoyl chloride, there is obtained lincomycin 7-hexanoate·HCl.

Analysis.—Calc'd for $C_{24}H_{45}N_2O_7SCl$: C, 53.27; H, 8.38; N, 5.18; S, 5.93; Cl, 6.55. Found: C, 52.94; H, 8.29; N, 4.93; S, 6.08; Cl, 6.66; $H_2O$, 4.14 (corrected for $H_2O$); molecular weight: 541.16.

EXAMPLE 7

By substituting the acetic anhydride in Example 1, Part C, by octyl chloride, there is obtained lincomycin 7-octanoate·HCl.

Analysis.—Calc'd for $C_{26}H_{49}N_2O_7SCl$: C, 54.86; H, 8.68; H, 4.92; S, 5.63. Found: C, 54.81; H, 7.96; N, 5.24; S, 5.71; $H_2O$, 5.22 (corrected for $H_2O$); molecular weight: 569.22.

EXAMPLE 8

By substituting the acetic anhydride in Example 1, Part C, by lauroyl chloride, there is obtained lincomycin 7-laurate·HCl.

Analysis.—Calc'd for $C_{30}H_{57}N_2O_7SCl$: C, 57.62; H, 9.19; N, 4.48; S, 5.13. Found: C, 57.46; H, 8.99; N, 4.80; S, 5.23; $H_2O$, 4.16 (corrected for $H_2O$); molecular weight: 625.27.

EXAMPLE 9

By substituting the acetic anhydride in Example 1, Part C, by palmitoyl chloride, there is obtained lincomycin 7-palmitate·HCl.

Analysis.—Calc'd for $C_{34}H_{65}N_2O_7SCl$: C, 59.93; H, 9.62; N, 4.11; S, 4.71; Cl, 5.20. Found: C, 59.70; H, 9.94; N, 4.06; S, 5.00; Cl, 5.33; $H_2O$, 4.38 (corrected for $H_2O$); molecular weight: 681.43.

EXAMPLE 10

By substituting the acetic anhydride in Example 1, Part C, by stearoyl chloride, there is obtained lincomycin 7-stearate·HCl.

Analysis.—Calc'd for $C_{36}H_{69}N_2O_7SCl$: C, 60.95; H, 9.80; N, 3.95; S, 4.52. Found: C, 61.15; H, 9.62; N, 4.25; S, 4.53; $H_2O$, 4.68 (corrected for $H_2O$); molecular weight: 709.43.

EXAMPLE 11.—LINCOMYCIN 7-(HEXYL CARBONATE)HYDROCHLORIDE 15 g. (0.024 mole) of 2,3,4-tris-O-trimethylsilyl)-lincomycin, a compound prepared in Example 1, Part B, was dissolved in 100 ml. of pyridine. The reaction was cooled to −35° C. and 5 g. (approximately 0.03 mole) of n-hexyl chloroformate was added dropwise. An additional 3 g. of n-hexyl chloroformate was added after 1 hr. The reaction mixture was stirred for an additional hour. The mixture was poured into 1 l. of ice-water acidified to pH 2 with concentrated hydrochloric acid. The aqueous suspension was immediately extracted with 750 ml. of ether, the extract dried with anhydrous magnesium sulfate, and the ether removed by warming on a steam bath. The resulting orange syrup was dissolved in 150 ml. of absolute methanol, 75 ml. of water was added, and 2 ml. of concentrated hydrochloric acid added slowly with good stirring. The mixture was stirred for 45 min. The pH of the solution was increased to pH 3 with sodium bicarbonate. All of the solvent was removed under 500 microns pressure and the resulting gum dissolved, with warming, in 500 ml. of acetone. The insoluble sodium chloride was removed by filtration and the filtrate concentrated to 200 ml. Ether was added to the cloud point and the solution placed overnight in a refrigerator. Crystals of lincomycin 7-(hexyl carbonate)·HCl were isolated from the solution by filtration and dried under vacuum, yield: 9.56 grams.

*Analysis.*—Calc'd for $C_{25}H_{47}O_8N_2SCl$: C, 52.57; H, 8.29; N, 4.90; S, 5.61; Cl, 6.21; equivalent weight: 571.18. Found: (corrected for $H_2O$); C, 52.15; H, 8.59; N, 5.36; S, 5.72; Cl, 6.26; $H_2O$, 2.78%; equivalent weight: 558.

EXAMPLE 12.—LINCOMYCIN 7-(HEXADECYL CARBONATE)HYDROCHLORIDE 25 g. (0.0401 mole) of 2,3,4-tris-O-trimethylsilyl-lincomycin, as prepared in Example 1, Part B, was placed in a 250 ml. Erlenmeyer flask and dissolved in 100 ml. of pyridine. Hexadecyl chloroformate (18 ml., 0.047 mole) was dissolved in 25 ml. of chloroform and added dropwise at room temperature to the stirred pyridine solution. This solution was stirred for 2 hrs. On thin layer chromatography, the reaction appeared to be approximately 70% complete after 2 hours. An additional 2 ml. of hexadecylchloroformate dissolved in 8 ml. of chloroform was added to the reaction mixture and stirred for 2 more hrs. The solution was then poured into 1500 ml. of ice-water, acidified to pH 1 with concentrated hydrochloric acid, and stirred well. The resulting suspension was extracted with 1 l. of ether, the ether dried with an hydrous magnesium sulfate, and the filtered magnesium sulfate washed with 500 ml. of chloroform. The chloroform and ether filtrates were combined and placed in a hood overnight. The remaining solvent was removed under reduced pressure and the resulting solids air-dried for 12 hrs. The solids were dissolved in 100 ml. of chloroform and shaken with 100 ml. of 0.1 N hydrochloric acid. The chloroform layer was dried with anhydrous magnesium sulfate and all the solvent removed under reduced pressure. The precipitate was dissolved in 100 ml. of acetone and placed in a refrigerator overnight. Crystalline lincomycin 7-(hexadecyl carbonate) hydrochloride was then obtained by filtration and dried in vacuo; yield, 13 g.

*Analysis.*—Calc'd for $C_{35}H_{67}O_8N_2SCl$: C, 59.09; H, 9.49; N, 3.94; S, 4.51; Cl, 4.98; equivalent weight: 711.45. Found: (corrected for $H_2O$); C, 58.28; H, 9.48; N, 4.20; S, 4.47; Cl, 4.85; $H_2O$, 3.99; equivalent weight: 734.

EXAMPLE 13

Upon substituting the n-hexyl chloroformate of Example 11 by methyl chloroformate, ethyl chloroformate, propyl chloroformate, butyl chloroformate, pentyl chloroformate, hexyl chloroformate, octyl chloroformate, nonyl chloroformate, undecyl chloroformate, dodecyl chloroformate, tridecyl chloroformate, tetradecyl chloroformate, pentadecyl chloroformate, hexadecyl chloroformate, heptadecyl chloroformate, and octadecyl chloroformate, there are obtained the corresponding lincomycin 7-carbonate esters.

We claim:
1. A process for preparing a compound selected from the group consisting of free bases and acid-addition salts of compounds of the structural formula:

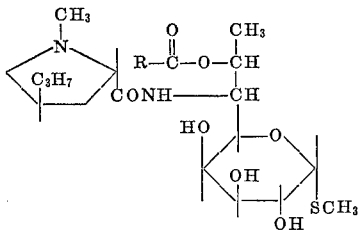

wherein

is a carboxylic acid acyl radical of from 2 to 18 carbon atoms, inclusive, which comprises:
  (1) reacting lincomycin with a silylating agent to produce 2,3,4,7-tetrakis-O-(trimethylsilyl)lincomycin;
  (2) selectively removing the silyl group from the 7-position of the molecule by mild acid hydrolysis to produce 2,3,4-tris-O-(trimethylsilyl)lincomycin;
  (3) acylating 2,3,4-tris - O - (trimethylsilyl)lincomycin with an acylating agent selected from the group consisting of lower-alkoxy carbonyl halides and the acid halides and acid anhydrides of hydrocarbon carboxylic acids of from 2 to 18 carbon atoms, to produce 2,3,4-tris - O - (trimethylsilyl)lincomycin 7-acylate;
  (4) selectively removing the silyl groups by mild acid hydrolysis; and,
  (5) isolating the lincomycin 7-acylate so produced.
2. A process for preparing lincomycin 7-acetate hydrochloride which comprises:
  (1) reacting lincomycin hydrochloride with hexamethyldisilazane and trimethylchlorosilane in the presence of pyridine to produce 2,3,4,7-tetrakis-O-(trimethylsilyl)lincomycin;
  (2) subjecting 2,3,4,7-tetrakis - O - (trimethylsilyl)-lincomycin to mild acidic hydrolysis and recovering 2,3,4-tris-O-(trimethylsilyl)lincomycin;
  (3) reacting 2,3,4-tris - O - (trimethylsilyl)lincomycin with acetic anhydride in the presence of pyridine to form 2,3,4-tris-O-(trimethylsilyl)lincomycin 7-acetate;
  (4) hydrolyzing 2,3,4-tris - O - (trimethylsilyl)lincomycin 7-acetate with a mild organic acid and recovering lincomycin 7-acetate hydrochloride.
3. A process for preparing a compound of the structural formula as disclosed in claim 1 which comprises:
  (1) acylating 2,3,4 - tris-O-(trimethylsilyl)lincomycin with an acylating agent selected from the group consisting of lower-alkoxy carbonyl halides and the acid halides and acid anhydrides of hydrocarbon carboxylic acids of from 2 to 18 carbon atoms, to produce 2,3,4-tris-O-(trimethylsilyl)lincomycin 7-acylate;
  (2) selectively removing the silyl groups by mild acid hydrolysis and, isolating the lincomycin 7-acylate so produced.
4. A process for preparing lincomycin 7-acetate hydrochloride which comprises:
  (1) reacting 2,3,4-tris - O - (trimethylsilyl)lincomycin with acetic anhydride in the presence of pyridine to form 2,3,4-tris - O - (trimethylsilyl)lincomycin 7-acetate;
  (2) hydrolyzing 2,3,4-tris-O-(trimethylsilyl)lincomycin duce 2,3,4,7-tetrakis-O-(trimethylsilyl)lincomycin;
7-acetate with a mild organic acid and recovering lincomycin 7-acetate hydrochloride.
5. A process for preparing a compound selected from the group consisting of free bases and acid-addition salts of compounds of the structural formula:

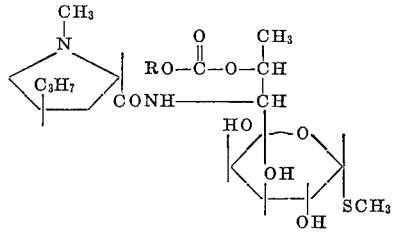

wherein R is a lower alkyl radical of from 1 to 18 carbon atoms, inclusive, which comprises:
  (1) reacting lincomycin with a silylating agent to produce 2,3,4,7-tetrakis-O-(trimethylsilyl)lincomycin)
  (2) selectively removing the silyl group from the 7-position of the molecule by mild acid hydrolysis to produce 2,3,4-tris-O-(trimethylsilyl)lincomycin;

11

(3) reacting 2,3,4-tris - O - (trimethylsilyl)lincomycin with a lower-alkyl halogenated carbonate in the presence of an acid-binding agent to produce 2,3,4-tris-O-(trimethylsilyl)lincomycin 7-lower alkyl carbonate;

(4) selectively removing the silyl groups by mild acid hydrolysis and, isolating the lincomycin 7-lower alkyl carbonate so produced.

6. A process for preparing lincomycin 7-(hexyl carbonate)hydrochloride which comprises:
(1) reacting 2,3,4-tris - O - (trimethylsilyl)lincomycin with n-hexyl chloroformate, in the presence of pyridine, to produce 2,3,4-tris-O-(trimethylsilyl)lincomycin 7-hexyl carbonate;
(2) reacting 2,3,4-tris-O-(trimethylsilyl)lincomycin 7-(hexyl carbonate) with hydrochloric acid; and,
(3) isolating the lincomycin 7-(hexyl carbonate)hydrochloride so produced.

7. A process for preparing lincomycin 7-(hexadecyl carbonate)hydrochloride which comprises:
(1) reacting 2,3,4-tris - O - (trimethylsilyl)lincomycin with hexadecyl chloroformate, in the presence of pyridine, to produce 2,3,4-tris-O-(trimethylsilyl)lincomycin 7-(hexadecyl carbonate);
(2) reacting 2,3,4-tris-O-(trimethylsilyl)lincomycin 7-(hexadecyl carbonate) with hydrochloric acid; and,

12

(3) isolating the lincomycin 7-(hexadecyl carbonate) hydrochloride so produced.

8. A process for preparing a compound of claim 5 which comprises:
(1) reacting 2,3,4-tris - O - (trimethylsilyl)lincomycin with a lower-alkyl halogenated carbonate in the presence of an acid-binding agent to produce 2,3,4-tris-O-(trimethylsilyl)lincomycin 7-loweralkyl carbonate;
(2) selectively removing the silyl groups by mild acid hydrolysis and, isolating the lincomycin 7-lower alkyl carbonate so produced.

References Cited

UNITED STATES PATENTS

| | | | |
|---|---|---|---|
| 3,418,414 | 12/1968 | Houtman | 260—210 |
| 3,326,891 | 6/1967 | Hoeksema et al. | 260—210 |
| 3,352,849 | 11/1967 | Shen et al. | 260—211.5 |
| 3,354,160 | 11/1967 | Duschinsky et al. | 260—211.5 |

LEWIS GOTTS, Primary Examiner

JOHNNIE R. BROWN, Assistant Examiner

U.S. Cl. X.R.

260—999

UNITED STATES PATENT OFFICE
CERTIFICATE OF CORRECTION

Patent No. 3,479,334                    Dated November 18, 1969

Inventor(s) R. L. Houtman, Walter Morozowich, A. A. Sinkula

It is certified that error appears in the above-identified patent and that said Letters Patent are hereby corrected as shown below:

Column 1, line 57, for "In other" read -- In another --. Column 2, lines 64-66, for "lincomycin is first converted to 3,4-O-arylidine lincomycin" read -- lincomycin 7-acylates and lincomycin 7-carbonates by the --. Column 4, line 29, for "a-," read -- o-, --; line 34, for "2,4,6, trinitrobenzoic" read -- 2,4,6-trinitrobenzoic --. Column 5, line 13, for "7-(hexyl)carbonate)" read -- 7-(hexylcarbonate) --; line 49, for "CH$_2$" read -- CH$_3$ --; lines 56-70 of the formula should
$\phantom{for "C}|\phantom{H_2" read -- }|$
$\phantom{for "CH_2}N\phantom{" read -- C}N$ read:

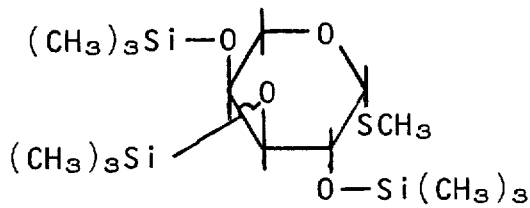

Column 5, lines 69-70 of the formula should read:

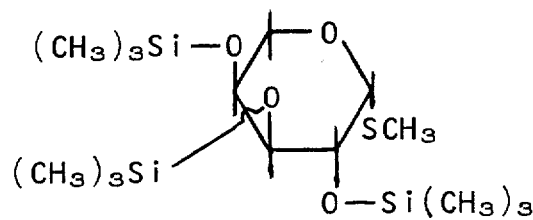

.

FORM PO-1050 (10-69)

3,479,334

R. L. Houtman et al.                     November 18, 1969

Column 6, lines 9-12, of the formula should read:

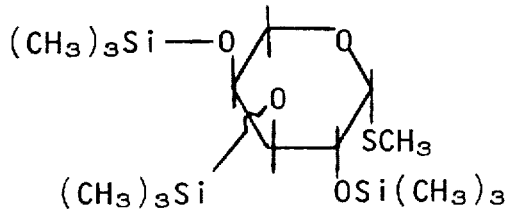

Column 6, line 68, for "(3 moles)" read -- (3 mmole) --.
Column 8, line 5, for "$C_{23}N_{43}N_2O_7SCl$" read -- $C_{23}H_{43}N_2O_7SCl$ --;
line 56, for "2,3,4-tris-O-trimethylsilyl)-" read
-- 2,3,4-tris-O-(trimethylsilyl)- --.  Column 9, line 14,
for "2,3,4-tris-O-trimethylsilyl)-" read -- 2,3,4-tris-O-(tri-
methylsilyl)- --; line 28, for "an hydrous" read -- anhydrous -.

SIGNED AND
SEALED
NOV 17 1970

(SEAL)
Attest:

Edward M. Fletcher, Jr.
Attesting Officer

WILLIAM E. SCHUYLER, JR.
Commissioner of Patents